(12) United States Patent
Wertheimer et al.

(10) Patent No.: US 6,717,676 B2
(45) Date of Patent: Apr. 6, 2004

(54) METHOD FOR MEASURING MAGNIFICATION OF AN AFOCAL OPTICAL SYSTEM

(75) Inventors: Alan L. Wertheimer, Pittsford, NY (US); John J. Hannon, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 103 days.

(21) Appl. No.: 10/095,388

(22) Filed: Mar. 12, 2002

(65) Prior Publication Data

US 2003/0174334 A1 Sep. 18, 2003

(51) Int. Cl.[7] .................................................. G01B 9/02
(52) U.S. Cl. ........................................................ 356/450
(58) Field of Search ................................ 356/450, 457, 356/458, 508, 519, 520

(56) References Cited

U.S. PATENT DOCUMENTS

| | | |
|---|---|---|
| 3,695,768 A | 10/1972 | Klye |
| 4,557,593 A | 12/1985 | Iwanade |
| 4,666,273 A | 5/1987 | Shimizu et al. |
| 4,678,899 A | 7/1987 | Baba et al. |
| 4,687,944 A | 8/1987 | Mitsuka et al. |
| 4,772,119 A | 9/1988 | Bouwhuis et al. |
| 5,093,680 A | 3/1992 | Suzuki et al. |
| 5,389,774 A | 2/1995 | Gelman et al. |
| 5,450,211 A | 9/1995 | Kanai et al. |
| 5,619,031 A | 4/1997 | Choate |
| 5,923,425 A * | 7/1999 | Dewa et al. ................. 356/520 |
| 5,946,028 A | 8/1999 | Ishikawa |
| 6,373,578 B1 * | 4/2002 | Nishikawa .................. 356/515 |

* cited by examiner

Primary Examiner—Samuel A. Turner
Assistant Examiner—Michael A. Lyons
(74) Attorney, Agent, or Firm—Mark G. Bocchetti

(57) ABSTRACT

A method is taught for measuring magnification of an afocal optical system. The method comprises the steps of directing a collimated light beam through the afocal optical system; intercepting the collimated beam exiting the afocal optical system with a prism; generating two reflected return beams at a first angle therebetween with the prism; passing the two reflected return beams through the afocal optical system; observing an interference pattern created by the two reflected return beams after exiting the afocal optical system; measuring a spacing between at least two fringes of the interference pattern; determining a second angle between the two reflected return beams exiting the afocal optical system using the spacing of the at least two fringes of the interference pattern; and comparing the second angle between the two reflected return beams exiting the afocal optical system to the first angle between the two reflected return beams immediately exiting the prism to thereby measure the magnification of the afocal optical system.

13 Claims, 3 Drawing Sheets

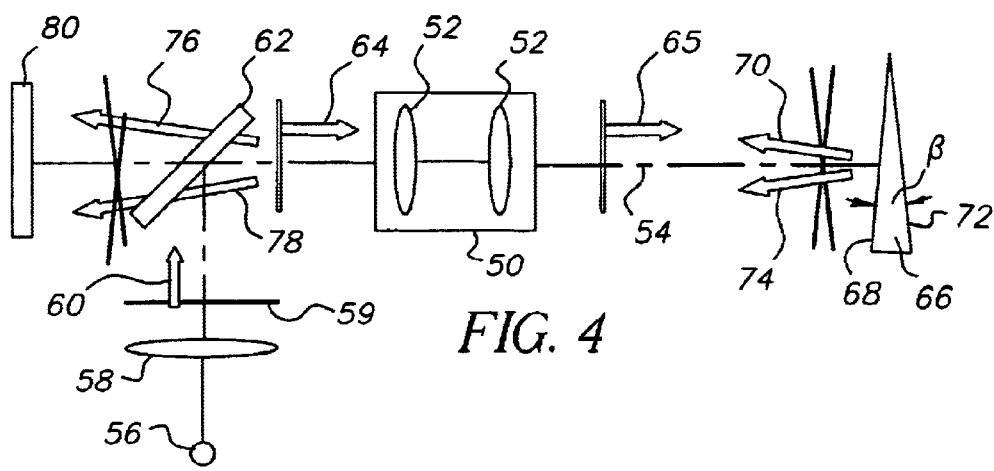
FIG. 4
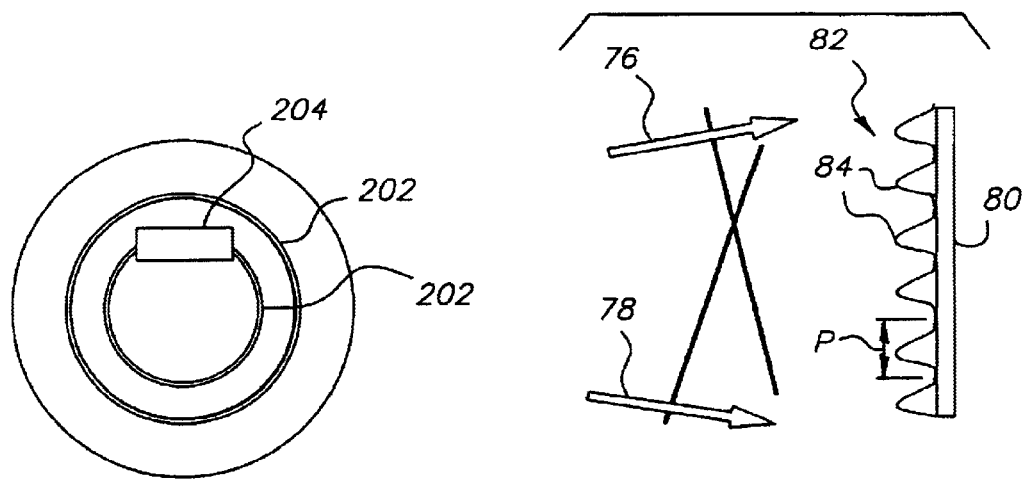
FIG. 9
FIG. 5
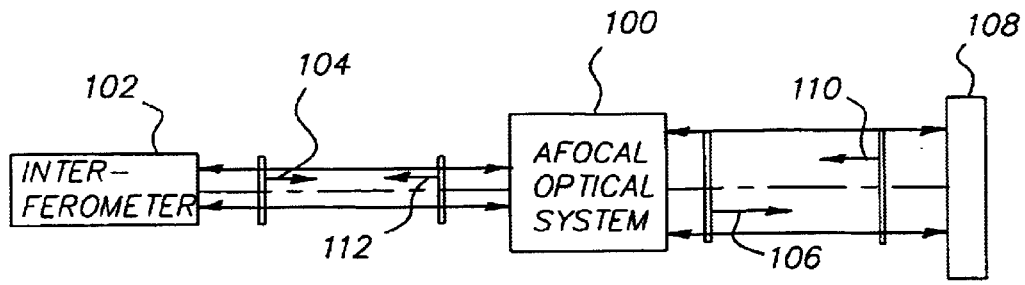
FIG. 6
(PRIOR ART)

METHOD FOR MEASURING MAGNIFICATION OF AN AFOCAL OPTICAL SYSTEM

FIELD OF THE INVENTION

The present invention relates generally to afocal optical systems and, more particularly, to methods and apparatus for accurately measuring the magnification of afocal optical systems.

BACKGROUND OF THE INVENTION

An afocal optical system accepts an input beam of collimated light and creates an output beam that is also collimated. Examples include binoculars, spyglasses, rifle scopes and telescopes. An afocal system does not, by itself, form a final image, and by definition, does not have a finite focal length. However, a comparable first order parameter for such a system is its (afocal) magnification. This is essential to know when combining an afocal optical system with other imaging elements.

Afocal optical instruments, such as binoculars and telescopes are common devices for making a distant object appear larger. It is also quite common to compute the afocal magnifying power of such instruments without independent experimental measurement. The magnification of a simple afocal system can be theoretically computed with knowledge of the individual components and the design of the system, by either using the ratio of the focal lengths of optical components or the ratio of the angles of the incoming and outgoing beams. This approach is consistent with U.S. Pat. No. 4,678,899 to Baba, et al, which discusses a class of variable magnification afocal lens systems where the magnification is changed by moving optical components with respect to each other. The resulting (afocal) magnification can be computed by knowing the locations of the components. However, no independent test is described to confirm it. In addition, if an afocal system is not perfectly aligned, a small amount of beam convergence or divergence may remain in the system. For many applications this slight departure from true afocal performance is not a problem. This slight convergence or divergence of the beam is commonly referred to as "residual power", or simply "power".

Independent measurement techniques for measuring afocal magnification are known for telescopes and binoculars based on visually comparing the angular subtense of an object, with and without the aid of the binoculars (or a telescope). No special instrumentation is used for this measurement, and accuracy is limited to a few percent with such methods.

More accuracy is attainable by measuring the change in the angle of incoming and outgoing beams, using optical alignment telescopes. Such methods, described hereinafter with reference to FIGS. 1 through 3, may be able to achieve 0.1% accuracy, but are unable to consistently provide the 20 to 50 parts per million accuracy (0.002% to 0.005%) required of certain very high performance afocal systems.

SUMMARY OF THE INVENTION

It is therefore an object of the present invention to provide a method for accurately measuring magnification of an afocal optical system.

It is a further object of the present invention to provide a method that allows for simultaneous, closely timed sequential, and/or iterative measurement of wavefront error, power, and magnification of an afocal optical system.

Another object of the present invention to is provide a method that has the ability to adjust or trim either or both the magnification and the power of an afocal system to great accuracy, reducing or eliminating the risk that a system will incur a residual power or wavefront error when adjusting magnification, or vice-versa.

Briefly stated, the foregoing and numerous other features, objects and advantages of the present invention will become readily apparent upon a review of the detailed description, claims and drawings set forth herein. These features, objects and advantages are accomplished by providing a method for measuring magnification of an afocal optical system comprising the steps of directing a collimated light beam through the afocal optical system, intercepting the collimated beam exiting the afocal optical system with an optical beam splitting device such as a prism, generating two return beams at a first angle therebetween with the optical beam splitting device, passing the two return beams through the afocal optical system, observing an interference pattern created by the two return beams after exiting the afocal optical system, measuring a spacing between at least two fringes of the interference pattern, determining an angle between the two return beams exiting the afocal optical system using the spacing of the at least two fringes of the interference pattern, and comparing the angle between the two return beams exiting the afocal optical system to an angle between the two return beams immediately exiting the prism to thereby measure the magnification of the afocal optical system.

The method of the present invention allows for greater accuracy in the measurement of the magnification of an afocal system. The method is especially useful for making or testing multiple afocal units. A specific example is described for a metrology station capable of unit-to-unit magnification control of better than ±30 parts/million.

BRIEF DESCRIPTION OF THE DRAWINGS

FIG. 4 is a schematic of the method of the present invention for measuring the magnification of an afocal optical system.

FIG. 5 is an exemplary interference light intensity pattern.

FIG. 6 is a schematic of one typical prior art alignment test stand for an afocal optical system.

FIG. 9 is an exemplary interference light intensity pattern showing a portion of the aperture being blocked from view by the prism.

DETAILED DESCRIPTION OF THE INVENTION

Figure 1:
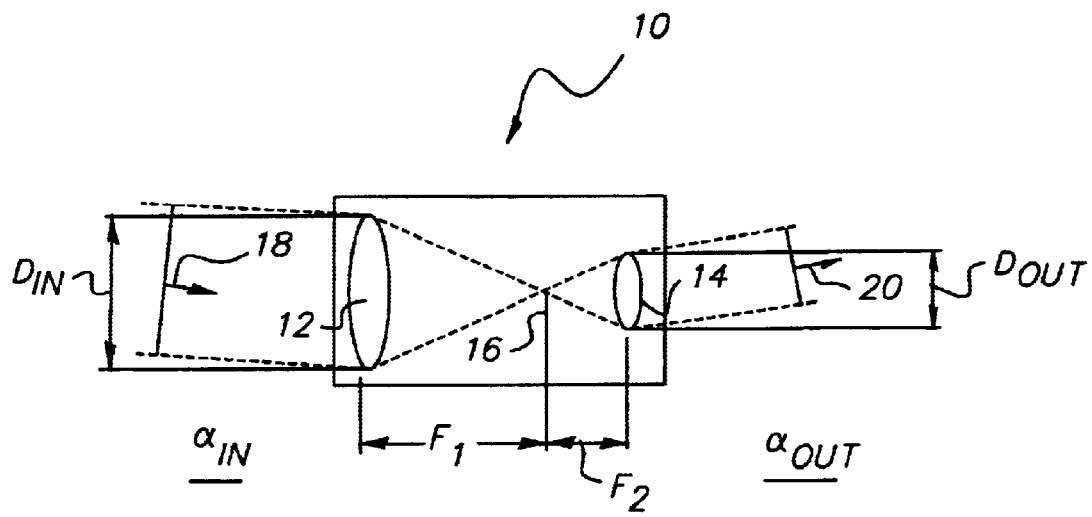
FIG. 1 is a schematic of a two-lens afocal optical system.

Turning first to FIG. 1 there is a presented a schematic of a two-lens afocal system 10. There is a first lens 12 having a focal length $F_1$ and a second lens 14 having a focal length $F_2$. While there is an intermediate image plane 16 between the lenses 12, 14, the lenses 12, 14 act together to take an input collimated beam 18 having a diameter, $D_{IN}$, and have it emerge as an exiting collimated beam 20 having a diameter, $D_{OUT}$. When the input beam 18 enters the first lens 12 at an angle of $\alpha_{IN}$, the exiting collimated beam 20 emerges at an angle, $\alpha_{OUT}$.

Using the two-lens afocal system 10 of FIG. 1 as an example, there are three ways to define the afocal magnification. First, afocal magnification may be defined as the ratio of focal lengths $F_1/F_2$. Second, afocal magnification may be defined as the ratio of input to output diameters, $D_{IN}/D_{OUT}$. Third, afocal magnification may be defined as the ratio of output to input beam angles, $\alpha_{OUT}/\alpha_{IN}$. To a first approximation, these three methods for determining afocal magnification give identical results. However, for real, multi-element optical systems, the internal focal lengths are difficult to determine especially if one only has access to an assembled and sealed afocal system. Further, precise measurement of the diameters $D_{IN}$, $D_{OUT}$ of the input and output beams 18, 20 may also be difficult, as one or both may be defined by the light beam size rather than any physical aperture accessible or measurable from the outside of the system. The most consistent and accurate method is the third approach, that being the measurement of input and output beam angles $\alpha_{IN}$, $\alpha_{OUT}$.

Figure 2:
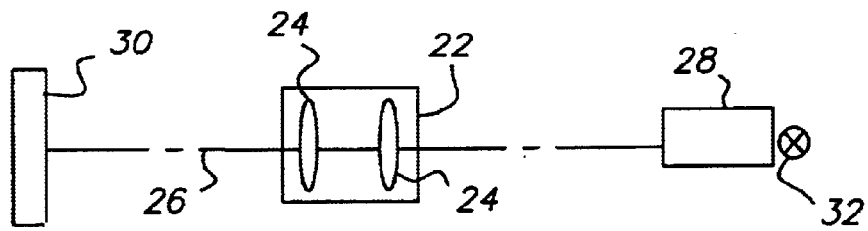
FIG. 2 is a schematic of a first step in a prior art method for measuring the magnification of an afocal optical system.

Referring next at FIG. 2, using the measurement of input and output beam angles $\alpha_{IN}$, $\alpha_{OUT}$, angular magnification can be measured for an afocal system 22, comprising of two or more lenses or other optical elements 24 having an optical axis 26 passing through the centers of curvature of the optical elements 24 in the afocal system 22. Per the known method for determining angular magnification, an alignment telescope 28 is placed on this optical axis 26 on one side of the afocal system 22, and a reflecting flat 30 is placed to intercept the optical axis 26 on the other side of the afocal system 22. The angular orientation of the reflecting flat 30 is adjusted to be perpendicular to the optical axis 26. When that is done, the image of cross hair target 32 projected from within the alignment telescope 28 is seen reflected back upon itself. This establishes the "zero" value for the next step of the process.

Figure 3:
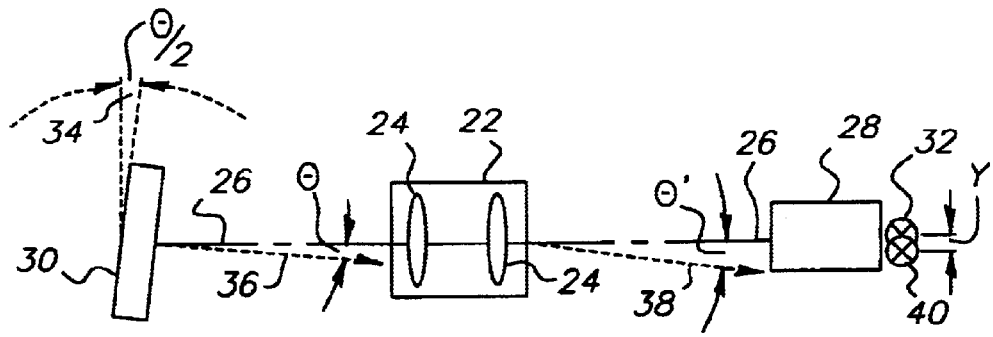
FIG. 3 is a schematic of a second step in the prior art method depicted in FIG. 2 for measuring the magnification of an afocal optical system.

Next (as depicted in FIG. 3) the reflecting flat 30 of FIG. 2 is reoriented to reside at an angle 34 of value, θ/2. The light from the cross hair target 32, when returned from the reflecting flat 30, as reflected beam 36 travels at an angle θ with respect to the optical axis 26. After passing through the afocal system 22, the reflected beam 36 emerges as beam 38 at an angle θ' with respect to the optical axis 26, angle θ and angle θ' being different from one another. The alignment telescope 28 forms an image 40 of the cross hair 32, displaced by a value, Y, corresponding to the angle θ'. Angle θ' can be calculated from Y by knowing the effective focal length (f) of the alignment telescope 28 using the equation $$Y=(f)(\theta') \quad (eq. 1)$$

Finally, the ratio of angles is the afocal magnification M as given by Equation 2 below $$M=\theta'/\theta \quad (eq. 2)$$

While there are numerous variations on the sequence just described, this and related approaches require the independent measurement of two angles, θ' and θ each time magnification is determined.

The improved approach of the present invention is schematically depicted in FIG. 4. This method and apparatus reduces both the number and the magnitude of the error sources and improves the consistency when measuring angular magnification of an afocal system 50. Again, the afocal system 50 comprised of two or more lenses or other optical elements 52 having an optical axis 54 passing through the centers of curvature of the optical elements 52. A point source of light 56 of wavelength, λ, is placed at the rear focal plane of lens 58 such that it creates a collimated plane wave 59 moving in the direction of arrow 60 toward a beam splitter 62. Beam splitter 62 then redirects a portion of the light along the optical axis 54 towards the afocal system 50, as shown by arrow 64. The plane wave passes through the afocal system 50 and continues along the axis 54 as shown by arrow 65, towards a wedged glass plate or prism 66. A portion of the light is reflected from the first surface 68 of the wedged plate 66, and returns towards the afocal system 50 in the direction of the arrow 70. Another portion of the light is reflected from the rear surface 72 of the wedged plate 66, and returns towards the afocal system 50 in the direction of the arrow 74. The angle between the directions 70 and 74 is 2θ and is fixed by angle β of the wedged plate or prism 66 between the front surface 68 and the rear surface 72, and the refractive index N of the wedged plate 66. The beams of light directed along arrows 70 and 74 then pass through the afocal system 50 and emerge as plane waves with new directions as indicated by arrows 76, 78, which form an angle between them of 2θ'.

A portion of each of the beams represented by arrows 76, 78 passes through the beam splitter, 62 to reach a detector 80. These beams interfere with each other to create an interference light intensity pattern 82 (see FIG. 5) consisting of a series of high contrast bands of light 84 of pitch, P, on the detector 80. The relationship between two angles, θ' and θ and the afocal magnification M is as defined previously in equation 2, $$\theta'/\theta=M=2\theta'/2\theta$$

The prism wedge angle β is a constant of the test set, providing a consistent value of 2θ. With no moving parts, the only measurement to be made is that of 2θ'. This is done by evaluating the interference fringe pattern 82 at the detector plane 80. As should be evident to those skilled in the art, the common path configuration followed by beams 70 and 74 on one side of the afocal system 50 and their corresponding beams 76 and 78 on the other side of the afocal system 50 creates a very stable interferometric pattern 82 on detector 80. The spacing of the fringes of this interferometric pattern yields an accurate measurement of the angle 2θ' between the beams 76, 78.

In addition to providing a method and apparatus for measuring magnification of an afocal optical system, the present invention also allows for simultaneous, closely timed sequential, and/or iterative measurement of wavefront error, residual power, and magnification of the afocal optical system. A schematic of a typical prior art alignment test stand for an afocal optical system 100 is shown in FIG. 6. An interferometer 102 transmits a collimated test beam 104 through the afocal optical system 100. A still collimated beam 106 emerges from the afocal optical system 100. Collimated beam 106 is then intercepted by the optical test flat 108 creating a reflected beam 110 that retraces the path of collimated beam 106 back through the afocal optical system 100. Reflected beam 110 which remains collimated exits the afocal optical system 100 as return beam 112 to return to the interferometer 102. Because the complete beam comprising beam segments 104, 106, 110, 112 travels through the afocal optical system 100 twice, this is commonly referred to as a "Double Pass" test. The return beam 112 is compared to a reference beam (not shown) generated in the interferometer 102, and optical aberrations, including power, are evaluated. Adjustments can be made to the components of the afocal optical system 100 under test at this test stand to evaluate the wavefront quality or to adjust the power to insure collimated input and output beams.

Figure 7:
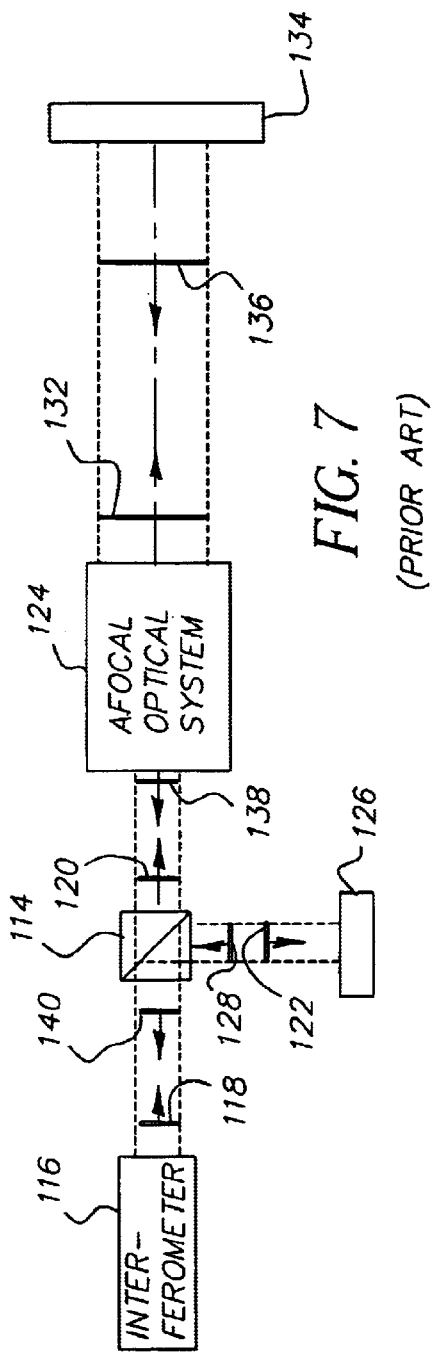
FIG. 7 is a schematic of a second typical prior art alignment test stand for measuring power of an afocal optical system.

The same test described with reference to FIG. 6 can also be performed with an external reference beam, generated by a beam splitter 114, such as shown in FIG. 7 (prior art). This is also a common approach. An interferometer 116 transmits a collimated test beam 118 that is split by the beam splitter 114 into a transmitted beam 120 and a reference beam 122. The transmitted beam 120 continues on through the afocal optical system 124, just as discussed for FIG. 6. Reference beam 122 is intercepted by a reference mirror at 126 and is bounced back as reflected beam 128. Transmitted beam 120 exits afocal optical system 124 to become beam 132. Beam 132 is intercepted by optical test flat 134 thereby generating reflected beam 136. Reflected beam 136 exits afocal optical system 124 as beam 138. Beam 138 and reflected reference beam 128 are recombined as they return through the beam splitter 114 to become return beam 140 which is subsequently evaluated in the interferometer 116.

Figure 8:
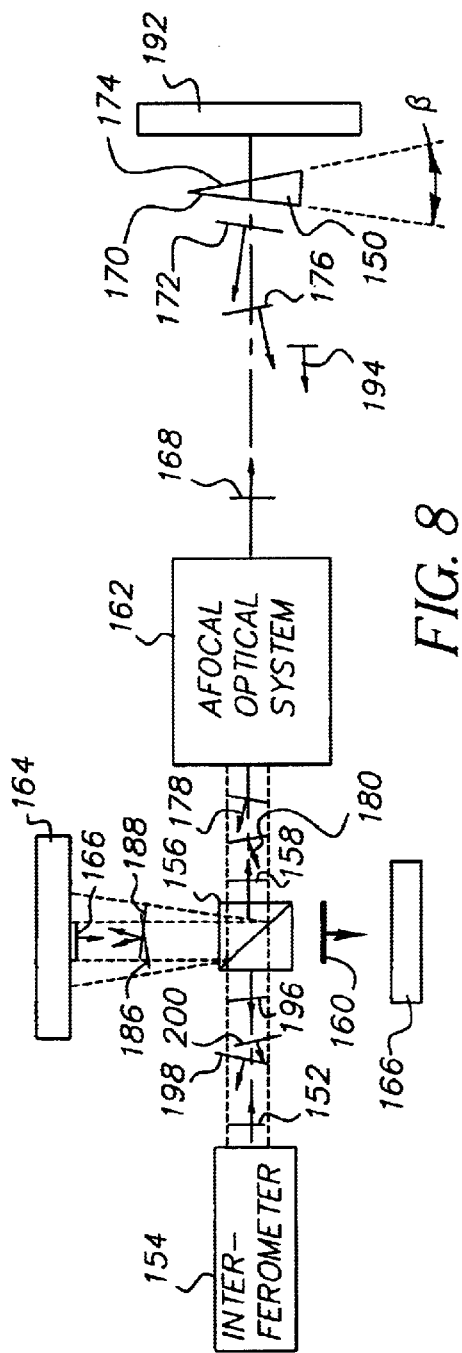
FIG. 8 is a schematic of an alignment test stand that can be used to simultaneously or intermittently measure magnification and power of an afocal optical system.

For some afocal optical systems, it is possible to independently change the power and the magnification. In such cases, measuring the wavefront quality (including power) and the magnification at the same time or at the same test location offers a saving of time and an improvement in accuracy. Either of the prior art systems depicted in FIGS. 6 and 7 can be modified to add this new capability by inserting a wedge 150 (such as shown in FIG. 4) therein as a subaperture of the optical test flat (see FIG. 8). A collimated beam (as indicated by arrow 152) from an interferometer 154 is directed at a magnification test beam splitter 156. The beam splitter 156 splits the collimated beam 152 into a transmitted beam 158 and a deflected beam 160. The transmitted beam 158 continues on through the afocal optical system 162. Deflected beam 160 is absorbed by a beam block 166. Transmitted beam 158 exits afocal optical system 162 to become beam 168. A portion of beam 168 is intercepted by a wedged glass plate or prism 150. A portion of the light is reflected from the first surface 170 of the wedged plate 150, and returns towards the afocal system 162 as a beam (as indicated by arrow 172). Another portion of the light is reflected from the rear surface 174 of the wedged plate 150, and returns towards the afocal system 162 as a beam (as indicated by arrow 176). The angle between the direction of beams 172 and 176 is 2θ and is fixed by angle β of the wedged plate or prism 150 between the front surface 170 and the rear surface 174, and the refractive index N of the wedged plate 150. The beams of light directed along arrows 172 and 176 then pass back through the afocal system 162 and emerge as plane waves with new directions as indicated by arrows 178, 180, which form an angle between them of 2θ'. A portion of each of the beams represented by arrows 178, 180 is reflected by beam splitter 156 yielding reflected beams as indicated by arrows 186, 188 directed toward the detector array 164 (e.g.—a pixelated sensor device such as a linear or two-dimensional CCD array). The other portion of return beams 178, 180 pass through the beam splitter as beams indicated by arrows 198, 200 toward interferometer 154. These beams indicated by arrows 198, 200 interfere with each other to create an interference light intensity pattern 82 (again as shown in FIG. 5) consisting of a series of high contrast bands of light 84 having a pitch (P). Again, as previously discussed with reference to FIG. 5, the relationship between angles θ' and θ, and the afocal magnification (M) is as defined previously in Equation 2

$$\theta'/\theta = M = 2\theta'/2\theta$$

The spacing of the fringes of the interferometric pattern 82 yields an accurate measurement of the angle 2θ' between beams 186, 188 as recorded by detector 164.

In addition, a portion of beam 168 misses prism 150 and is intercepted by optical test flat 192 thereby generating a reflected beam as indicated by arrow 194. Reflected beam 194 passes through the optical system 162 and the beam splitter 156 to become return beam 196. The return beam 196 is compared to a reference beam (not shown) generated in the interferometer 154, and optical aberrations, including power, are evaluated.

The two interfering reflected beams indicated by arrows 186, 188 which are sensed by the detector array 164, allow a parallel and simultaneous measurement of magnification while the interfereometer, 154, evaluates optical aberrations and power. Sequential measurement, if preferred, can be done by inserting the beam splitter 156 intermittently, to acquire the angularly separated returning beams.

FIG. 9 illustrates the light intensity pattern generated in the interfereometer, 154, by the returning beams 196,198, 200. The concentric circular fringes, 202, represent the interference pattern associated with residual power in the returning beam 196 (from FIG. 8). These fringes can be interpreted by conventional methodology to determine power and other aberrations associated with the afocal system.

The small rectangular area, 204, represents the outline of the prism 150 (from FIG. 8) as projected into the interferometer 154. Within this outline are a series of very high density fringes, 84 as shown in FIG. 5. These fringes will be too high in density to be interpreted by the interferometer, 154 but can be evaluated by the auxiliary detector, 164, previously described.

Since, as shown in FIG. 9, the prism 150 will block a portion of the aperture from view for the wavefront/power tests, some thought and planning must go into the subaperture size and placement. The majority of the aperture should remain available for conventional interferometric wavefront analysis. The interferometer will treat it as an "obstruction", working around it as it would any other obstructed area. Nonetheless, if the obstruction becomes too large, the accuracy of the wavefront characterization will be degraded.

There are several advantages to creating a combined afocal test station as described here. As already discussed, it allows simultaneous, closely timed sequential, and/or iterative measurement of wavefront error, power, and magnification. Of particular value is the ability to adjust or trim either or both the magnification and the power of an afocal system to great accuracy, reducing or eliminating the risk that a system will incur a residual power or wavefront error when adjusting magnification, or vice-versa. For example, this can be done by adjusting the relative axial spacing of the components of the afocal system. This also provides a simple method to add magnification metrology to an existing test station without requiring an additional laser or interferometer.

In terms of the metrology for the magnification channel, the two beams reflected from the prism return along essentially the same optical path, creating what is known as a "common path" configuration. Thus, when measuring the fringe spacing at the detector created by the beam interference, the pattern will be largely insensitive to laser mode changes, unequal path coherence differences, or air turbulence effects that can cause troublesome errors in conventional interferometry.

A prism 66 as discussed above with reference to FIGS. 4 and 8 is the preferred element for generating the two return beams needed in the practice of the method of the present invention. However, those skilled in the art will recognize that other optical bi-angular beam reflecting devices may also be used in place of a prism to generate the two return beams. For example, a diffraction grating or a hologram may be used in place of the prism. Understand, however, that with a prism, the two return beams would be reflected beams whereas, with a diffraction grating or a hologram, technically speaking, the two return beams would be diffracted beams.

From the foregoing, it will be seen that this invention is one well adapted to obtain all of the ends and objects hereinabove set forth together with other advantages which are apparent and which are inherent to the apparatus.

It will be understood that certain features and sub-combinations are of utility and may be employed with reference to other features and sub-combinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

PARTS LIST

| | |
|---|---|
| 10 | two lens afocal system |
| 12 | first lens |
| 14 | second lens |
| 16 | intermediate image plane |
| 18 | input collimated beam |
| 20 | exiting collimated beam |
| 22 | afocal system |
| 24 | optical elements |
| 26 | optical axis |
| 28 | alignment telescope |
| 30 | reflecting flat |
| 32 | cross hair target |
| 34 | angle |
| 36 | reflected beam |
| 38 | beam |
| 40 | image |
| 50 | afocal system |
| 52 | optical element |
| 54 | optical axis |
| 56 | source of light |
| 58 | lens |
| 59 | collimated plane wave |
| 60 | arrow (showing direction) |
| 62 | beam splitter |
| 64 | arrow (showing direction) |
| 65 | arrow (showing direction) |
| 66 | wedged plate or prism |
| 68 | front surface |
| 70 | arrow (showing direction) |
| 72 | rear surface |
| 74 | arrow (showing direction) |
| 76 | arrow (showing direction) |
| 78 | arrow (showing direction) |
| 80 | detector |
| 82 | light intensity pattern |
| 84 | bands of light |
| 100 | afocal optical system |
| 102 | interferometer |
| 104 | test beam |
| 106 | collimated beam |
| 108 | optical test flat |
| 110 | reflected beam |
| 112 | return beam |

-continued

PARTS LIST

| | |
|---|---|
| 114 | beam splitter |
| 116 | interferometer |
| 118 | test beam |
| 120 | transmitted beam |
| 122 | reference beam |
| 124 | afocal optical system |
| 126 | reference mirror |
| 128 | reflected beam |
| 132 | beam |
| 134 | optical test flat |
| 136 | reflected beam |
| 138 | beam |
| 140 | return beam |
| 150 | wedge |
| 152 | collimated beam |
| 154 | interferometer |
| 156 | test beam splitter |
| 158 | transmitted beam |
| 160 | deflected beam |
| 162 | afocal optical system |
| 164 | detector array |
| 166 | beam block |
| 168 | beam |
| 170 | first surface |
| 172 | beam |
| 174 | rear surface |
| 176 | beam |
| 178 | arrow (showing direction) |
| 180 | arrow (showing direction) |
| 186 | arrow (reflected beams) |
| 188 | arrow (reflected beams) |
| 192 | optical test flat |
| 194 | arrow (reflected beam) |
| 196 | return beam |
| 198 | arrow (beam) |
| 200 | arrow (beam) |
| 202 | circular fringes |
| 204 | rectangular area |

What is claimed is:

1. A method for determining magnification of an afocal optical system comprising the steps of:
   (a) directing a collimated light beam through the afocal optical system;
   (b) intercepting the collimated beam exiting the afocal optical system with a bi-angular beam reflector;
   (c) generating two return beams at a first angle therebetween with the bi-angular beam reflector;
   (d) passing the two return beams through the afocal optical system;
   (e) observing an interference pattern created by the two return beams after exiting the afocal optical system;
   (f) measuring a spacing between at least two fringes of the interference pattern;
   (g) determining a second angle between the two return beams exiting the afocal optical system using the spacing of the at least two fringes of the interference pattern; and
   (h) comparing the second angle between the two return beams exiting the afocal optical system to the first angle between the two return beams immediately exiting the first optical beam splitter to thereby measure the magnification of the afocal optical system.

2. A method as recited in claim 1 wherein:
   the collimated beam is first directed through a beam splitter.

3. A method as recited in claim 2 wherein:
   the two reflected return beams are intercepted by a detector.

4. A method as recited in claim 3 wherein:
the collimated beam is generated with an interferometer.

5. A method as recited in claim 2 wherein:
only a first portion of the collimated beam is intercepted by the bi-angular beam reflector, a second portion of the collimated beam being intercepted by an optical test flat.

6. A method as recited in claim 5 further comprising the steps of:
  (a) reflecting the second portion of the collimated beam off of the optical test flat and back through the afocal optical system;
  (b) receiving the second portion of the collimated beam reflected off of the optical test flat with the interferometer;
  (c) comparing the second portion of the collimated beam reflected off of the optical test flat with a reference beam to determine a power of the afocal optical system.

7. A method as recited in claim 1 wherein:
the collimated beam is generated with a point light source.

8. A method as recited in claim 1 wherein:
the two return beams are reflected beams.

9. A method as recited in claim 1 wherein:
the two return beams are diffracted beams.

10. A method as recited in claim 1 wherein:
the bi-angular beam reflector is a prism.

11. A method for determining magnification of an afocal optical system comprising the steps of:
  (a) directing a collimated light beam through the afocal optical system;
  (b) intercepting the collimated beam exiting the afocal optical system with a prism;
  (c) simultaneously generating two return beams at a first angle therebetween with the a prism;
  (d) passing the two return beams through the afocal optical system;
  (e) observing an interference pattern created by the two return beams after exiting the afocal optical system;
  (f) measuring a spacing between at least two fringes of the interference pattern;
  (g) determining a second angle between the two return beams exiting the afocal optical system using the spacing of the at least two fringes of the interference pattern; and
  (h) comparing the second angle between the two return beams exiting the afocal optical system to the first angle between the two return beams immediately exiting the prism to thereby measure the magnification of the afocal optical system.

12. An apparatus for determining magnification of an afocal optical system comprising:
  (a) a collimated light source directing a collimated beam of light through the afocal optical system;
  (b) a bi-angular beam reflector intercepting the collimated beam of light exiting the afocal optical system, the bi-angular beam reflector generating two return beams at a first angle therebetween, the two return beams passing back through the afocal optical system; and
  (c) a detector intercepting the two return beams after they have passed back through the afocal optical system, the detector allowing a user to observe an interference pattern created by the two return beams after exiting the afocal optical system thereby allowing the user to measure a spacing between at least two fringes of the interference pattern and to determine a second angle between the two return beams exiting the afocal optical system using the spacing of the at least two fringes of the interference pattern.

13. An apparatus as recited in claim 12 wherein:
the bi-angular beam reflector is a prism.

* * * * *